United States Patent [19]

Hornyos et al.

[11] Patent Number: 4,830,797

[45] Date of Patent: May 16, 1989

[54] PROCESS FOR THE PRODUCTION OF CLOSED GAS-CELLULAR GRANULAR MATERIALS

[76] Inventors: Janos Hornyos, Petzvál u. 22/d, Budapest; Gyula Millei, Somogyi B.u. 53, Nagykanizsa; László Németh, Bánhidai ltp. 212, Tatabánya; Ottó Wágner, Könyves Kálmán u. 29, Miskolc, all of Hungary

[21] Appl. No.: 59,880

[22] PCT Filed: May 8, 1986

[86] PCT No.: PCT/HU86/00028

§ 371 Date: Jun. 15, 1987

§ 102(e) Date: Jun. 15, 1987

[87] PCT Pub. No.: WO86/06713

PCT Pub. Date: Nov. 20, 1986

[30] Foreign Application Priority Data

May 8, 1985 [HU] Hungary .................................. 1732

[51] Int. Cl.$^4$ .............................................. B29C 27/60
[52] U.S. Cl. .................................. 264/43; 252/378 P; 252/378 R; 106/DIG. 2; 501/84
[58] Field of Search ................ 501/80, 84; 252/378 P, 252/378 R; 264/43; 106/DIG. 2

[56] References Cited

U.S. PATENT DOCUMENTS 2,021,956 11/1935 Gladney .......................... 252/378 R
2,466,001 4/1949 Burwell ............................ 252/378 P Primary Examiner—William R. Dixon, Jr.
Assistant Examiner—Anthony J. Green
Attorney, Agent, or Firm—Herbert Dubno; Jonathan Myers

[57] ABSTRACT

A closed gas-cell cellular material is formed by heat treating a hydrosilicate, especially perlite, at a low temperature and then in the form of grains of a grain size of 5 to 8000 micrometers, feeding these grains through a space at a temperature of 800° C. to 2000° C. for a short residence time at a uniform space load of 0.1 to 500 kg/h. Then the grains are subjected to thermal shock in a thermal shock space connector directly to the feed spacing and heated to 1,000° C. to 3,500° C. The density of the granular material thus produced is 0.12 to 27 g/cm$^3$ and the weight per volume thereof at 0.01 to 1 kg/liter.

5 Claims, No Drawings

PROCESS FOR THE PRODUCTION OF CLOSED GAS-CELLULAR GRANULAR MATERIALS

CROSS REFERENCE TO RELATED APPLICATIONS

This application is a National Phase Application corresponding to PCT/HU86/00028 filed 8 May 1986 and based, in turn, upon Hungarian application No. 1732/85 filed 8 May 1985.

FIELD OF THE INVENTION

The invention relates to a process for the production of granular material for use in industry and agriculture, such as in construction, as a synthetic material, in furniture, in mining, for blasting, in metallurgy, in fire-fighting, for electrical insulation, in heat and sound insulation, for filtration, etc.

The process according to the invention is suitable for the production by heat treatment of the granular material from starting materials available in large quantity in nature and/or exploitable at a low cost, e.g. from natural silicates, oxide minerals and intermetallic compounds, the beneficial properties of which provide versatile applicability and manifold value in use. The steps of the process are aimed at developing gas formation, and evolution of gas from the starting material with thermal load pulses, to make the starting material foamy. The material recovered from the heat treatment space is a granular material containing closed bubbles and gas cells. The size and number of the gas cells and the quantity, thickness of the surrounding material are variable over wide ranges, and can be planned in advance depending on the quality and grain size of the starting material and on the operating conditions of the heat treatment process.

BACKGROUND OF THE INVENTION

There are heat treatment processes in practice for the production of lightweight materials from natural or artificial silicates. One of the best known forms of such materials is the expanded perlite used more and more extensively today for its advantageous properties. Upon expansion of the perlite, gas develops in the starting material, but the rate of development of the gas is such that closed gas cells are not evolved; rather the grains explode. For this reason expanded perlite is of an open-pore structure. This gives rise in undesirable properties such that its range of application—though it is very wide—cannot be extended to certain fields. Such undesirable properties include: low mechanical strength and hydroscopicity. On account of these two drawbacks, the expanded perlite can be used in construction and in the construction-material industry only to a limited extent.

Glass-like materials consisting of small or large grains has been required for solving several technical problems in the practice. The applicability of such materials would be even more advantageous, if the grains could be of closed pore structure, i.e. the cells are filled with gas. Materials having such properties can be produced in different ways, but the common characteristic of all the known processes is that they are complicated and expensive and treatment of the surface is difficult. Thus these processes became economical only for special applications. The use of such materials in the construction industry is not profitable and not economical.

OBJECT OF THE INVENTION

The object of the invention is to provide a process for making a closed-cell product which meets the following requirements:
suitability for mass production,
yields a relatively inexpensive product from low-cost materials,
volume weight (bulk density), surface properties, and grain size which is variable within wide limits, or selectable in advance, depending on the field of application,
the material should not be hygroscopic,
the material should be heat- and fire-resistant,
the mechanical strength of the material should be relatively high, and the materials should be suitable for heat-, sound- and electrical insulation.

DESCRIPTION OF THE INVENTION

The object is achieved according to the invention by recognizing the fact, that if the material selected as the starting material has a chemical composition of which is similar to a glassy materials or a metal oxide mineral, but in raw condition contains constitutional water, or materials decomposing under heat and this material is subjected to appropriate thermal pretreatment and gasifying heat treatment, then—depending on the composition of the raw material, temperature, method, duration of the heat treatment—a granular material containing closed gas cells and having properties suited to the objective can be produced.

In essence the process according to the invention involves sizing, heat treatment, chemical treatment of natural and/or artificial starting material (containing components decomposing or developing upon heat) of 5–8000 $\mu$m, preferably below 300 m grain size.

The process according to the invention is characterized in that the granulated material in a given case is subjected to a thermal pretreatment; then the material is fed at a feed temperature of 800°–2000° C. at a uniform 0.1–500 kg/h, preferably 0.5–50 kg/h space load into a directly or indirectly heated space at a temperature of 800°–5000° C. ensuring a gasifying thermal shock or pulse, and the closed gas cellular, granular material of 0.12–2.7 g/cm$^3$ density and 0.01–1.6 kg/l volume weight thus produced is retained, collected and removed.

Preferably the starting material prior to the feeding and/or after the gasifying thermal shock is subjected once or several times to preliminary and/or subsequent surface treatment with a material, e.g. silicone-oil, which is suitable to ensure the required surface-, or foaming properties of the end product.

The thermal pretreatment takes place with different methods. For example, the raw hydrosilicate is treated at constant temperature for an appropriate period, then it is subjected to gasifying thermal shock, but quick and reliable moisture-, volatile or decomposing material adjustment can be carried out by combining the thermal pretreatment with gasifying thermal shock in a continuous operation without interruption. The material can be subjected to a heating effect and then continuously fed into the high temperature space, so that first the grains pass through a space at a temperature of 800°–2000° C. (charging temperature) for short residence time, and then they pass into the high temperature of 1000°–3500° C.—depending on the material—for the gasifying thermal shock. The dynamic pretreatment is realizable and adjustable with the rate of feeding, suitable space load and space temperature or distribution. The grains exposed to such thermal pretreatment are subjected to gasifying thermal shock in the higher temperature space of suitable temperature (1000°–3500°, while feeding of the granular material is carried out at a strictly uniform rate, in the course of which the decomposing developing components of the silicate minerals, metal compounds and oxide minerals form bubbles in the grains surrounded by glassy or metallic melt-structures keeping them as closed cells.

In cases when the grain surface requires a special property, or the gasifying process has to be improved, then according to the process—depending on the required special surface and other properties—appropriate chemical pretreatment and/or after-treatment is used. Such chemical treatment can include the application of organic compounds, petroleum distillates, coloring agents, synthetics, silicones, etc., in sufficient quantity onto the surface of the grains.

If required by the final surface property (wettability or another surface property for use of the granular as a carrier material, etc.) the granular material already containing closed gas cells can be subjected to a subsequent surface treatment, in the course of which the surface treating material or materials are elutriated, dried, burned onto the grains, incidentally applied before cooling of the grains, or by other means.

The subsequent surface treatment of the grains forming the end product is sufficient for numerous tasks.

When a preliminary surface treatment is used, in order that the density property and grain size distribution of the granular material containing closed gas cells should best comply with the required purposes, the quality of the product has to be uniform. The selection of the material used for the treatment, the precise stipulation and observance of the method, temperature, duration of the thermic pretreatment, and the use of a heat source variable over a wide range, ensuring high temperature space required for the gasifying thermal shock, and feeding in the raw material with uniform space-load are important for uniformity. Direct or indirect, electric, gas-fired, oil-heated, plasma-flame type heat sources are applicable to provide high temperature space for the heat treatment.

The uniform grain feeding (space load) required for the gasifying thermal shock in the process according to the invention is provided with suitable equipment (vibrational, feed worm type, or like feeders).

Advantages of the process according to the invention include:

a widely applicable closed cellular, granular material of varying density property is produced from inexpensive hydrosilicates, preferably from perlite, the process being at the same time suitable for use with other materials containing decomposing or developing components e.g. various metal compounds, oxide minerals, etc. as basic material;

the density of the end product according to the process is 0.12–2.7 g/cm³ density range (0.05–1.6 kg/liter bulk density) and can be adjustable to the required value;

the surface of the grain can be regarded as inert from from a chemical point of view and can have surface physical and chemical properties of which can be adjusted with preliminary and/or subsequent surface treatment, depending on requirements as to use of the closed gas cellular, granular material (as carrier material with large surface, filling material, space filler, heat-, sound- and electrical insulator, packing material, etc.);

the process is equally applicable for the gasifying heat treatment of silicate minerals, artificial glasses, glassy silicates, other natural and artificial basic material containing decomposing or liberating components, as well as for the production of transparent and opaque end products; and the product can meet an extensive demand in the field of water-wet, nonwater-wet insulating, carrier, filler, space-filling materials, etc.

SPECIFIC EXAMPLES

A fraction of raw perlite below 65 m subjected to fine grinding is pretreated in a suitable metal container at 60° C. temperature for 20 minutes, then the so pretreated basic material is admitted into a worm or vibrating feeder. The feeder is set as to ensure 1–2 kg/h feed rate (space load) into the high temperature gasifying space. The feeding temperature that is the second step of the thermic pretreatment, is 700°–1200° C. as set by the correct adjustment of the heat source (e.g. with the aid of auxiliary air, oxygen, full gas flow, depending on the heat source). The once preheated raw perlite is admitted with such a charging mechanism to the front-part of the so-adjusted and controlled heat space, which first takes up the feeding space temperature during the 0.10–1.0 sec residence time, then in quickly preheated condition passes into the high temperature space, where upon the gasifying thermal shock it turns into end product characterized with appropriate parameters. Carrying out the process by way of examples, the following versions were examined:

EXAMPLE 1

Closed gas cellular, granular material was produced from ground perlite below 65 μm using the process according to the invention, with the following treatment parameters:
Pretreatment temperature: 60° C.
Duration of pretreatment: 20 min
Feeding space temperature: 800° C.
Gasifying space temperature: 1800° C.
Space load: 1 kg/h
The main characteristics of the product are contained in Table 1.

EXAMPLE 2

Closed gas cellular, granular material was produced from ground perlite below 65 μm using the process according to the invention, with the following treatment parameters:
Gasifying space temperature: 1900° C.
Pretreatment temperature: 80° C.
Duration of pretreatment: 20 min
Feeding space temperature: 1000° C.
Space load: 2 kg/h
The main characteristics of the product are contained in Table 1.

EXAMPLE 3

Gas bubbly, granular material was produced from highly borian glass composition below 65 μm using the process according to the invention, with the following treatment parameters:
Pretreatment temperature: 60° C.
Duration of pretreatment: 20 min
Feeding space temperature: 800° C.

Gasifying space temperature: 1800° C.
Space load: 1 kg/h
The main characteristics of the product are contained in Table 1.

EXAMPLE 4

Gas bubbly, granular material was produced from highly borian glass composition below 65 μm using the process according to the invention, and both the raw basic material and the end product were surface treated (silicone treatment) to obtain a hydrophobic surface.

The production parameters were the following:
Silicone pretreatment: 0.03 kg/material
Pretreatment temperature: 60° C.
Duration of pretreatment: 20 min
Feeding saace temperature:800° C.
Gasifying space temperature: 1800° C.
Space load: 1 kg/h
After treatment with silicone: 0.03 kg/material The main characteristics of the product are contained in Table 1.

EXAMPLE 5

Closed gas cellular, granular material was produced from ground perlite having a grain size below 65 μm using the process according to the invention, by silicone treatment of the raw ground product prior to heat treatment, with the following treatment parameters:
Silicone pretreatment: 0.020 kg/kg material
Duration of pretreatment: 20 min
Feeding space temperature: 800° C.
Gasifying space temperature: 1800° C.
Space load: 1 kg/h The main characteristics of the product are contained in Table 1.

EXAMPLE 6

Closed gas cellular, granular material was produced from ground perlite below 65 μm using the process according to the invention, by subsequent silicone treatment of the end product, with the following parameters:
Pretreatment temperature: 100° C.
Duration of pretreatment: 60 min
Feeding space eemperature: 1200° C.
Gasifying space temperature: 2100° C.
Space load: 1.5 kg/h The main properties of the product are contained in Table 1.

TABLE 1

Main characteristics of the closed gas cellular, gas bubbly, granular end product produced in versions 1-8.

| 1. No. of example | 2. Prevailing grain dia. m | 3. Grain density g/cm$^3$ | 4. Weight per liter of grain | 5. Oil uptake cm$^3$/100 cm$^3$ | 6. Water uptake cm$^3$/100 cm$^3$ |
|---|---|---|---|---|---|
| 1. | 150 | 0.151 | 0.070 | 1.3 | 34.0 |
| 2. | 165 | 0.272 | 0.160 | 2.1 | 35.4 |
| 3. | 110 | 0.432 | 0.286 | 4.4 | 38.0 |
| 4. | 95 | 0.488 | 0.311 | 18.8 | 29.1* |
| 5. | 160 | 0.145 | 0.060 | 22.0 | 3.3* |
| 6. | 160 | 0.145 | 0.060 | 28.1 | 0.0* |
| 7. | 160 | 0.145 | 0.060 | 35.2 | 0.0* |
| 8. | 80 | 0.865 | 0.532 | 4.2 | 33.0 |

The value of water uptake was measured after contact with water for 2 hours

The examples demonstrate that the granular material containing closed gas cells reaches the lowest density, or weight per liter, when starting out with hydrosilicate as natural silicate mineral. The surface of the highly borian glass composition is highly hydrophilic, the surface of the glass-melt enclosing the bubble is not smooth; hence considerable water uptake occurs after silicone treatment. The glass enamel as artificial glass does not give satisfactory result in respect of the gas bubbling, because the proportion of the bubbly grains is relatively small, and the outer cover of the bubbly grains is thick

What we claim is:

1. A process for the production of a closed-cell cellular granular material, consisting essentially of the steps of:
   (a) heat treating grains of a comminuted hydrosilicate thermally activatable to produce a gas intrinsically and form cells in the material and of a grain size of 5 to 8,000 μm at a temperature between 60° C. and 100° C. for a period of about 20 to 60 minutes;
   (b) thereafter continuously feeding the heat-treated grains of step (a) through a feed space at a temperature of 800° C. to 2,000° C. for a short residence time at a uniform space load of 0.1 to 500 kg/h;
   (c) continuously following step (b) suddenly and uniformly introducing the grains subjected to treatment in step (b) to gasifying thermal shock in a thermal-shock space connected directly to said feed space and heated to a temperature above that of said feed space and between 1,000° C. to 3,500° C. to transform said grains into a closed-cell granular cellular material;
   (d) controlling the space load, temperature and distribution of the material in steps (b) and (c) to maintain the density of said closed-cell granular material at 0.12 to 27 g/cm$^3$ and the weight per volume thereof at 0.01 to 1 kg/liter; and
   (e) recovering said closed-cell granular cellular material with a density of 0.12 to 27 g/cm$^3$ and a weight per volume of 0.01 to 1 kg/liter from said thermal shock space.

2. The process defined in claim 1 wherein said hydrosilicate is perlite.

3. The process defined in claim 2 wherein said hydrosilicate has a grain size below 300 μm.

4. The process defined in claim 3 further comprising the step of subjecting the recovered closed-cell granular cellular material to treatment with a silicone.

5. The process defined in claim 3 further comprising the step of treating said grains of hydrosilicate prior to step (c) with a silicone.

* * * * *